(12) United States Patent
Oestermeyer et al.

(10) Patent No.: US 12,522,257 B2
(45) Date of Patent: Jan. 13, 2026

(54) END CAP FOR VACUUM DISCHARGE OUTLET GATE AND METHOD

(71) Applicant: A. Stucki Company, Moon Township, PA (US)

(72) Inventors: David Oestermeyer, Downers Grove, IL (US); William Borowski, Lemont, IL (US); Edward Fox, Chicago, IL (US); James M. McLaughlin, Thornton, IL (US)

(73) Assignee: A. Stucki Company, Moon Township, PA (US)

( * ) Notice: Subject to any disclaimer, the term of this patent is extended or adjusted under 35 U.S.C. 154(b) by 693 days.

(21) Appl. No.: 17/578,029

(22) Filed: Jan. 18, 2022

(65) Prior Publication Data

US 2022/0234630 A1 Jul. 28, 2022

Related U.S. Application Data

(60) Provisional application No. 63/142,031, filed on Jan. 27, 2021.

(51) Int. Cl.
| | |
|---|---|
| *B61D 7/16* | (2006.01) |
| *B61D 7/32* | (2006.01) |
| *B65G 65/34* | (2006.01) |

(52) U.S. Cl.
CPC .............. *B61D 7/32* (2013.01); *B65G 65/34* (2013.01)

(58) Field of Classification Search
CPC . B61D 5/004; B61D 5/08; B61D 7/32; B61D 7/00; B61D 7/16; B65D 90/10; B65D 90/34; B65G 65/34

USPC .......................................... 406/145, 120, 128
See application file for complete search history.

(56) References Cited

U.S. PATENT DOCUMENTS

| | | | |
|---|---|---|---|
| 2,190,727 A | 2/1940 | McKenna | |
| 2,418,302 A | 4/1947 | Hornbrook | |
| 3,105,721 A * | 10/1963 | Collins | .................... B61D 7/00 |
| | | | 222/316 |
| 3,797,891 A * | 3/1974 | Fritz | .................. B65G 53/4658 |
| | | | 105/283 |

(Continued)

OTHER PUBLICATIONS

Bottom Filters and Seals, www.salproducts.com.

(Continued)

*Primary Examiner* — Charles P. Cheyney
(74) *Attorney, Agent, or Firm* — Buchanan Ingersoll & Rooney PC

(57) ABSTRACT

A vented end cap for an outlet gate comprises a generally cylindrical body, a disc-shaped end wall with at least one flow aperture; a vent hood on the exterior of the end wall defines an air flow passage having an inlet opening and communicates with the flow aperture; a filter support housing on the interior surface of the end wall, defines an air flow chamber having an exit opening communicating with the flow aperture, and with the interior of the vented end cap. A filter media is supported on filter support housing between the flow aperture and the exit opening. A railroad car outlet gate includes one of the vented end caps at each end of a discharge tube with outlet openings at each end. A method includes removal of one vented end cap and applying a vacuum to the uncovered discharge opening. In one form, a filter clean seal is disposed at each outlet opening.

13 Claims, 11 Drawing Sheets

(56) References Cited

U.S. PATENT DOCUMENTS

| | | | | |
|---|---|---|---|---|
| 4,018,484 A * | 4/1977 | Dugge | ............... | B65G 53/52 |
| | | | | 406/129 |
| 4,081,107 A * | 3/1978 | Martin, Jr. | ............. | B65D 90/10 |
| | | | | 215/310 |
| 4,315,579 A * | 2/1982 | Martin, Jr. | ............. | B65D 90/34 |
| | | | | 220/374 |
| 4,609,126 A * | 9/1986 | Janda | ............... | H05K 7/20009 |
| | | | | 220/374 |
| 4,902,173 A * | 2/1990 | Hendee | ............... | B61D 7/16 |
| | | | | 105/358 |
| 5,064,089 A * | 11/1991 | Schultz | ............... | B65D 90/10 |
| | | | | 220/372 |
| 5,387,058 A | 2/1995 | Smoot | | |
| 5,813,352 A * | 9/1998 | Bramlett | ............... | F16J 13/16 |
| | | | | 220/372 |
| 6,085,664 A * | 7/2000 | Early | ............... | B65D 90/10 |
| | | | | 105/377.07 |
| 8,060,264 B2 * | 11/2011 | Oestermeyer | ......... | B65D 90/32 |
| | | | | 701/19 |
| 9,493,172 B2 * | 11/2016 | McLaughlin | ............ | B61D 7/30 |
| 11,548,536 B1 * | 1/2023 | Anderson | ............... | B61D 5/08 |

OTHER PUBLICATIONS

Clean Seal—Sales Drawing, Jul. 25, 1994.
U.S. Appl. No. 14/208,730, filed Mar. 13, 2014, U.S. Pat. No. 9,493,172.

* cited by examiner

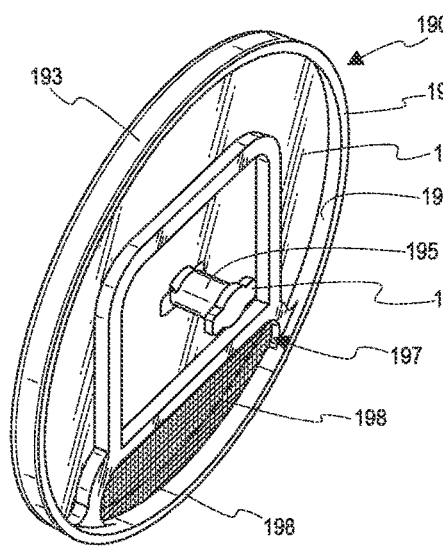
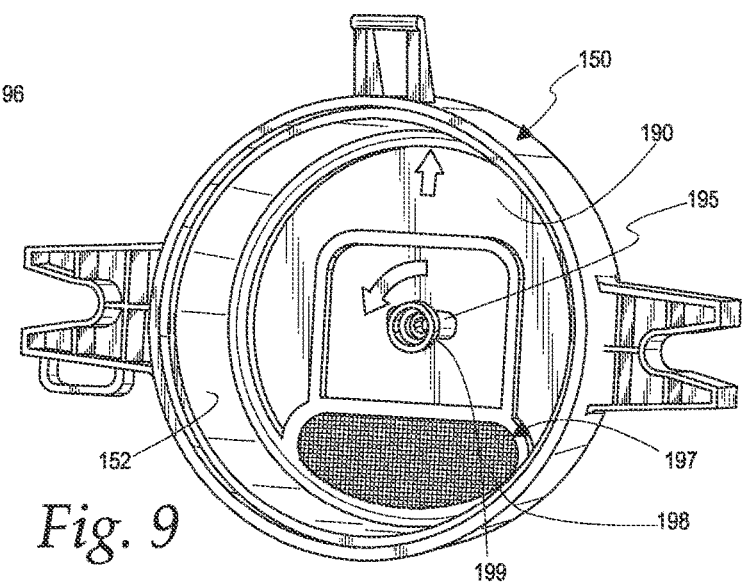

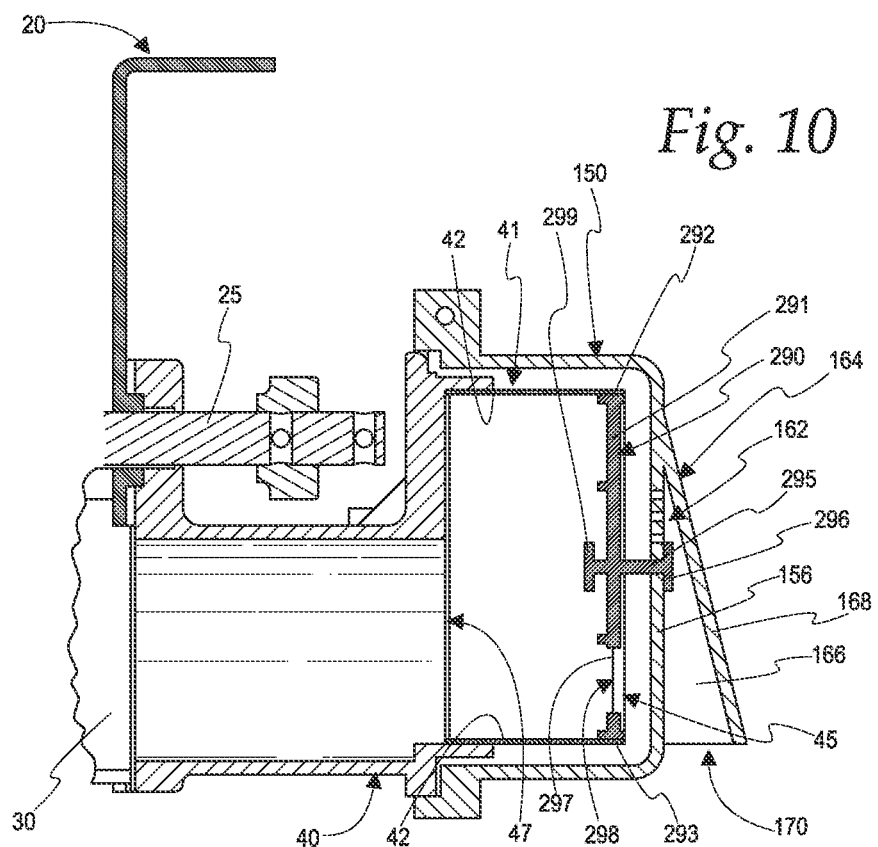

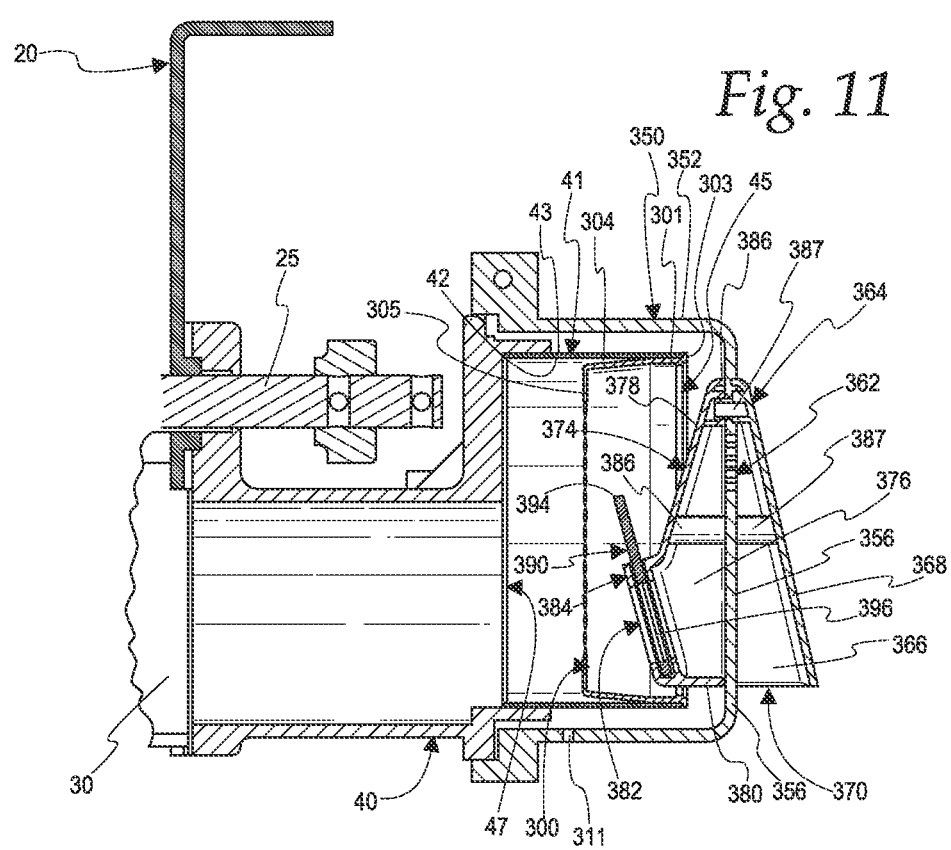

END CAP FOR VACUUM DISCHARGE OUTLET GATE AND METHOD

CROSS-REFERENCE TO RELATED APPLICATIONS

This application claims priority pursuant to 35 USC Sec. 119(e) to U.S. provisional application Ser. No. 63/142,031, filed Jan. 27, 2021, entitled "End Cap for Vacuum Discharge Outlet Gate and Method," the entire specification and drawings of which are hereby incorporated by reference herein as if fully set forth.

BACKGROUND

This disclosure relates to outlet gate assemblies on railroad hopper cars employing a vacuum discharge system for unloading the lading from the car. More particularly, it relates to an end cap for such assemblies that permits vacuum discharge with access to only one side of the car.

Vacuum discharge outlet gates are illustrated, for example, in U.S. Pat. Nos. 3,797,891 and 4,902,173. U.S. Pat. No. 9,493,172 discloses, in particular, with reference to FIGS. 11 and 12, vented end caps or covers to removably close the opposite ends of a conventional vacuum discharge outlet gate of a railroad hopper car. This arrangement permits vacuum unloading with access to only one end of the outlet gate. The disclosure of this latter patent is hereby incorporated herein by reference and hereby made a part hereof as if fully set forth.

SUMMARY

This disclosure is directed to an apparatus and method useful for unloading a railroad hopper car for carrying particulate lading employing a vacuum discharge transfer system. Such cars include several lading compartments with an outlet discharge gate or valve mounted adjacent the bottom of each compartment.

A vented end cap for an outlet gate for unloading a railroad car carrying particulate lading, comprises a generally cylindrical body, a disc-shaped end wall with an interior and exterior surface and at least one flow aperture extending therethrough; a vent hood on the exterior surface of the end wall defines air flow passage having an inlet opening communicating with the flow aperture; a filter support housing on the interior surface of the end wall, defines an air flow chamber having an exit opening communicating with the flow aperture, and with the interior of the vented end cap, and a filter media is supported on the filter support housing between the flow aperture and the exit opening.

An outlet gate for unloading a railroad car carrying particulate lading, comprises a manual valve closure mechanism, a discharge tube disposed below the manual valve closure mechanism, and an end adapter at each end having a cylindrical outlet tube defining a discharge opening, a removable vented end cap is secured to each outlet tube having a generally cylindrical body surrounding the cylindrical outlet tube, a disc-shaped end wall with an interior and exterior surface and at least one flow aperture extending through the end wall; a vent hood on the exterior surface defining an air flow passage having an inlet opening communicating with the flow aperture; a filter support housing defining an air flow chamber having an exit opening communicating with the flow aperture and with the interior of the vented end cap; and a filter media is supported on the filter support housing between the flow aperture and exit opening.

A method of unloading a railroad car carrying particulate lading having an outlet gate mounted adjacent the bottom of the car, comprises a manual valve closure mechanism, a discharge tube disposed below the manual valve closure mechanism and an end adapter at each end having a cylindrical outlet tube defining a discharge opening, a removable vented end cap is secured to each outlet tube having a generally cylindrical body having surrounding the cylindrical outlet tube, a disc-shaped end wall with an interior and exterior surface and at least one flow aperture extending therethrough; a vent hood on the exterior surface of defining an air flow passage having an inlet opening communicating with the flow aperture; a filter support housing defining an air flow chamber having an exit opening communicating with the flow aperture and with the interior of the vented end cap; and a filter media supported on the filter support housing between the flow aperture and the exit opening; the method comprises: removing one of the end caps from one of the outlet tubes, attaching a vacuum mechanism to the outlet tube from which said vented end cap has been removed, opening the manual valve closure mechanism and applying a vacuum to the discharge opening connected to the vacuum mechanism.

DESCRIPTION OF THE DRAWINGS

FIG. 8 is a perspective view of a clean seal suitable for use in conjunction with the end cap of FIG. 5.

FIG. 9 is a perspective view of the interior of the end cap of FIG. 5 with the clean seal of FIG. 8 assembled within the interior of the end cap.

FIG. 10 is a fragmentary sectional view similar to FIGS. 2 and 5 showing a portion of the outlet gate of FIG. 1 with a modified form of vented end cap and clean seal illustrative of the principles of the present disclosure.

FIG. 11 is a fragmentary sectional view, similar to FIGS. 2, 5 and 10, showing a portion of the outlet gate of FIG. 1 with another modified form of vented end cap and clean seal screen illustrative of the principles of the present disclosure.

DESCRIPTION OF THE ILLUSTRATED EMBODIMENTS

Figure 1:
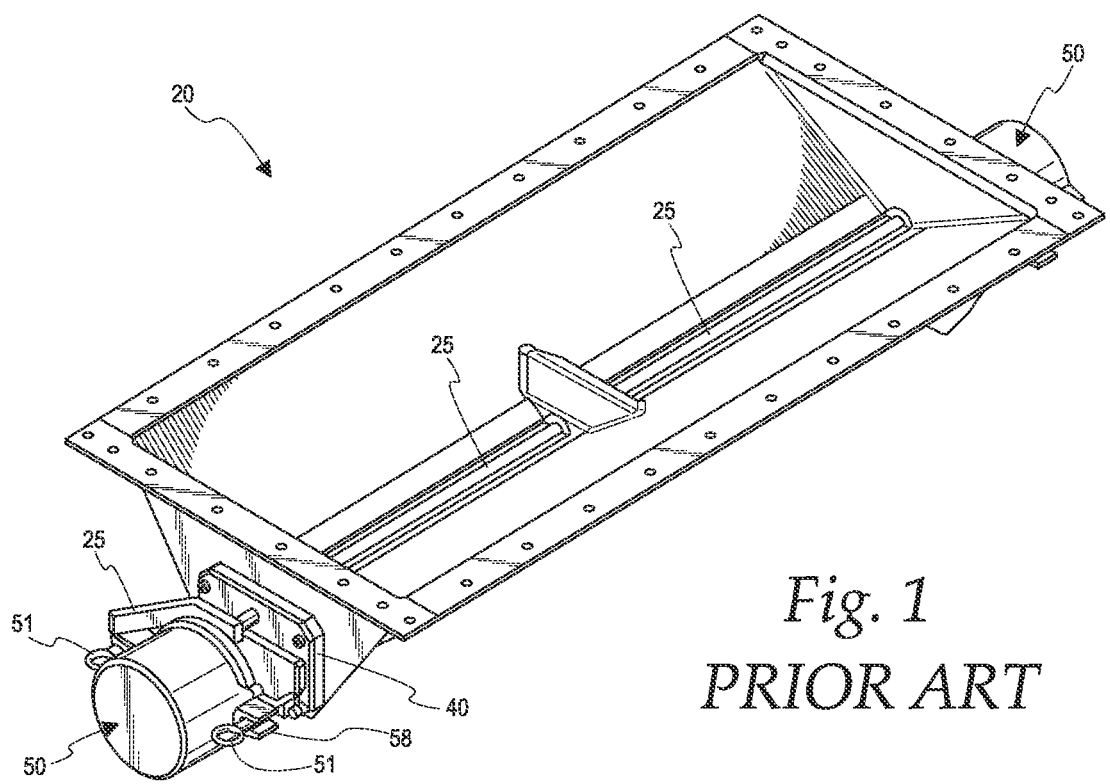
FIG. 1 is a perspective view of an outlet gate for a hopper car having a vacuum discharge tube with opposite ends closed by removable end caps.
Figure 2:
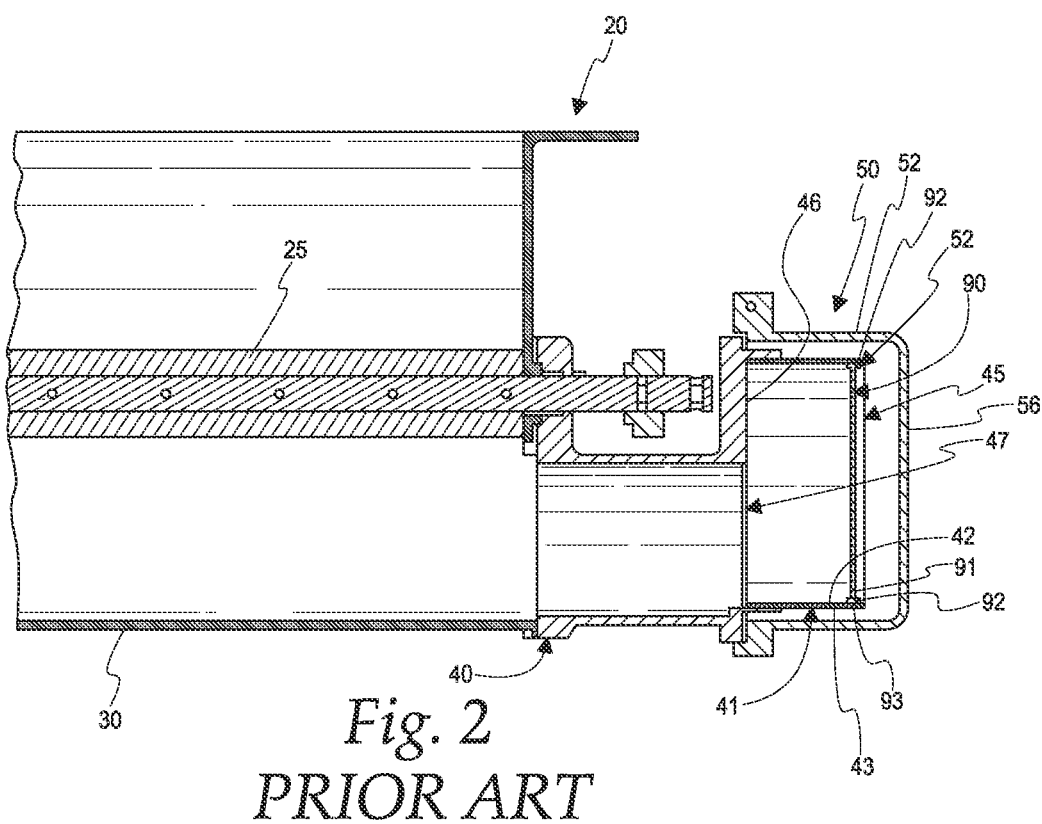
FIG. 2 is a fragmentary sectional view of a portion of the outlet gate of FIG. 1 with a discharge tube closed by a removable end cap.

FIGS. 1 and 2 of this application show views of an outlet gate assembly, generally designated 20, for attachment to the bottom end of a hopper car lading compartment. As is well known, the outlet gate assembly 20 includes a manually operable valve mechanism 25 to contain the lading within the hopper car compartment above a discharge tube 30 located at the bottom of the outlet gate 20. When opened, valve mechanism 25 permits the contained materials to flow into discharge tube 30.

Disposed transversely, perpendicular to the length of the car, the discharge tube extends between end adapters 40, each of which includes a cylindrical outlet tube 41, having an interior cylindrical surface 42, and an exterior cylindrical surface 43, defining discharge opening 45. (See FIG. 2.)

Figure 3:
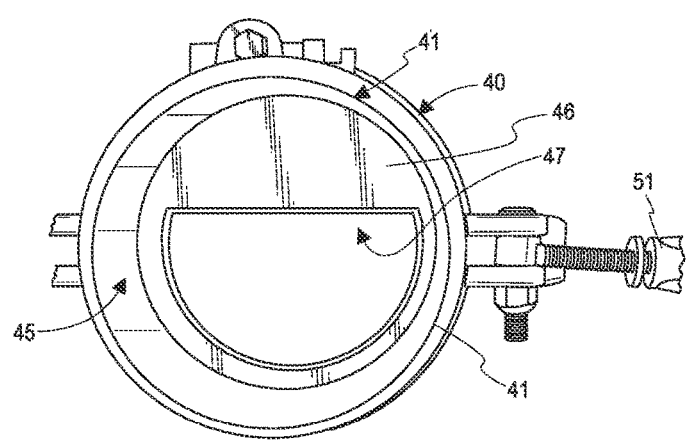
FIG. 3 is an end view of a discharge opening of an end adapter at one end of the discharge tube of the outlet gate of FIG. 1.

FIG. 3 is an end view of one end adapter 40. It shows the cylindrical outlet tube 41 with discharge opening 45. A circular back wall 46 includes a semicircular passage 47 that communicates with discharge tube 30. The passage 47 is formed to occupy the lower 180° of the circular back wall 46.

The cylindrical outlet tubes 41 of an outlet gate 20 are each configured for connection of a vacuum hose of the unloading station or terminal. Since the end adapters 40 at each opposite end of the outlet gate discharge tube 30 each include a cylindrical outlet tube 41, the car may be connected to an unloading station regardless of its orientation within the terminal.

On a hopper car filled with lading, the discharge openings 45 are secured from the elements by removable caps or covers 50 releasably connected to each of the end adapters 40, usually by eye bolts 51 seen in FIGS. 1 and 3.

Covers, or caps 50 have a generally cylindrical body 52, an attachment flange 54 at an open end and a disc-shaped end wall 56. Radial tabs 58 receive eye bolts 51 to secure the covers in place. In addition, to ensure against intrusion of contaminants, each cylindrical outlet tube 41 is protected by a disposable "clean seal" 90. Illustrated in FIGS. 2 and 4, seal 90 is impervious and positioned within each cylindrical outlet tube 41 at the discharge opening 45. Clean seals 90 may comprise a molded polymeric disc 91 held in the inner cylindrical surface 42 of discharge openings 45 by compressive friction on outer cylindrical surface 93 of an integral outer rim 92 of somewhat increased cross-section.

Hopper cars of the type described here traditionally carry plastic pellets, often color concentrate, used in the manufacture of plastic components. In these processes, avoidance of contamination of pellets or intermixing of colors is of paramount concern. Clean seals 90 positioned within the outlet tubes 41 are an important element of this procedure. The presence of clean seals represents a confirmation that after cleaning and loading, the car lading compartment has not been tampered with or contaminated.

Emptying the lading of a hopper car compartment at a terminal having vacuum discharge requires removal of the end caps or covers 50 from each end adapter 40. Removal of the clean seal 90 from each of the outlet tubes 41 is also necessary to the removal flow path. A vacuum hose is connected to one outlet tube 41 of one end adapter 40. The end cap 50 and clean seal 90 at the other end must be removed to permit adequate air flow. The vacuum hose draws a vacuum within the discharge tube 30 with inward air flowing through the far end outlet tube 41. Atmospheric pressure on the lading causes it to move into and through discharge tube 30 to a storage container for later consumption.

As described in U.S. Pat. No. 9,493,172, use of the vented end cap there disclosed permits the process to proceed without removal of the end cap at the inaccessible end of the discharge tube. (The far side of the car relative to the vacuum hose connection at the accessible, or, near end). It is only necessary to remove one cover, to attach the vacuum hose to the discharge tube 30. As described, air flow necessary to lading removal is provided through the passages and filters of the vented cap or cover at the far end of the discharge tube.

Turning now to FIGS. 5 through 9, there is disclosed a system, including vented end cap or cover 150, that provides the known advantages of car unloading with single side access, and in addition, provides improved flow and enhanced lading removal rate. In addition to vented end cap or cover 150, the system incorporates an insertable filter clean seal 190 to provide lading integrity and security reliance.

Figure 5:
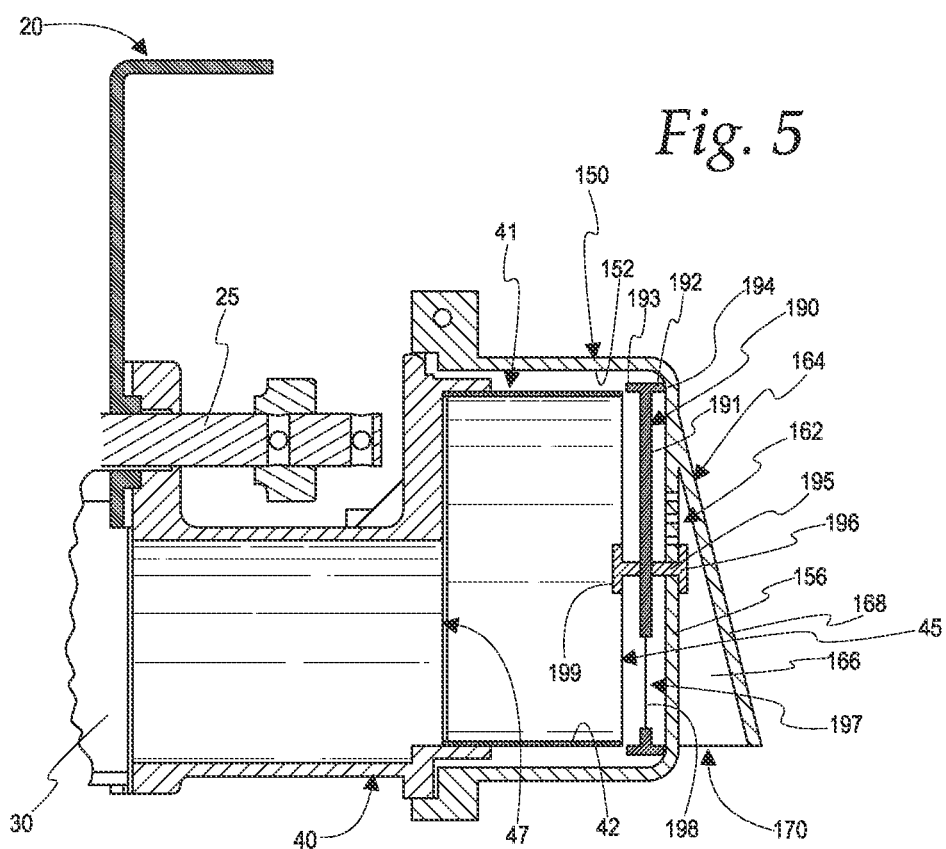
FIG. 5 is a fragmentary sectional view, similar to FIG. 2, showing a portion of the outlet gate of FIG. 1 and a vented end cap illustrative of principles of the present disclosure.

FIG. 5 illustrates the vented end cap or cover 150 and filter clean seal 190 in association with a typical outlet gate 20 with discharge tube 30 connected between end adapters 40, each having a cylindrical discharge tube 41. As is understood, though only one transverse end of discharge tube 30 is illustrated, the outlet gate 20, as illustrated in FIG. 1, includes two end adapters 40 connected to opposite ends of discharge tube 30. Each end adapter 40 includes a cylindrical outlet tube 41 having an interior cylindrical surface 42, an exterior cylindrical surface 43 defining a discharge opening 45.

Each end of the discharge tube 30 is protected from the elements by a vented cover 150 on cylindrical outlet tube 41, as illustrated by FIG. 5. As stated, in this arrangement, removal of cover 150 at the far end of the outlet gate 20 is not necessary to the unloading process. It should be understood, however, that the near end of outlet gate 20 accessible to the unloading operator, including discharge tube 30 and end adapter 40, is configured identically to the far end described here in reference to FIG. 5.

In this embodiment, except during unloading, each end of outlet gate 20 includes an attached protective vented cover 150 and filter clean seal 190. As previously described, the unloading process involves removal of only the near or accessible end cover 150 which carries associated filter clean seal 190. When the hopper car compartment is being unloaded, a vacuum hose is connected to the outlet tube 41 of the accessible end of the discharge tube 30, the end not shown in FIG. 5.

Figure 6:
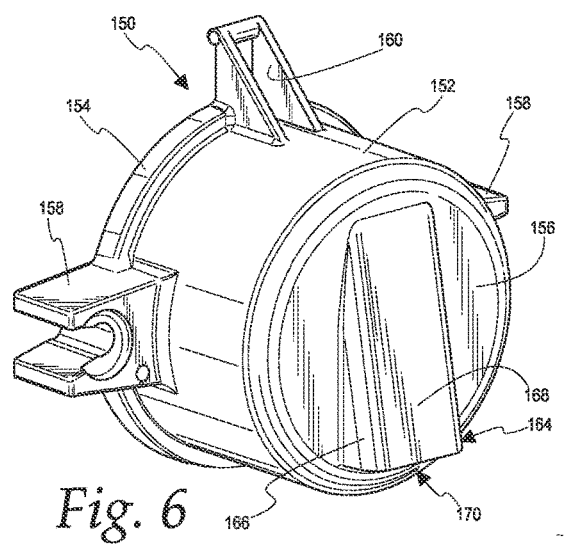
FIG. 6 is a perspective view of the interior of the end cap of FIG. 5, illustrative of features of the present disclosure.
Figure 7:
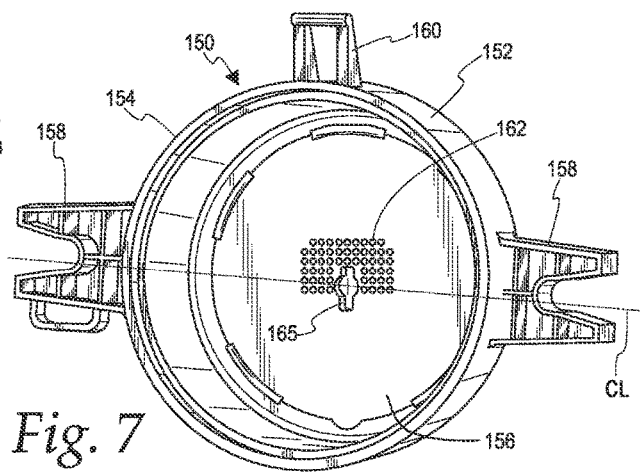
FIG. 7 is a perspective view of the interior of the end cap of FIG. 5, illustrative of other features of the present disclosure.
Figure 12:
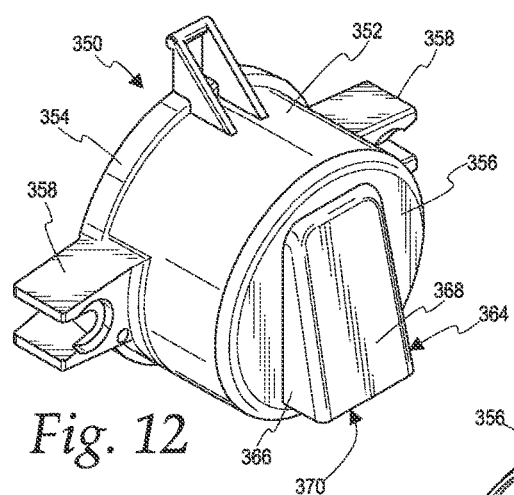
FIG. 12 is a perspective view of the exterior of the vented end cap of FIG. 11.

Referring to FIGS. 6 and 7, each vented end cap or cover 150 of this embodiment includes a generally cylindrical body 152 with an attachment flange 154 at an open end and a circular or disc-shaped end wall 156 closing its other end.

The cap is usually a molded plastic component. It includes pairs of radial tabs 158 disposed 180° apart on the flange 154. As shown in FIG. 7, tabs 158 are located equidistant from the horizontal centerline of the generally cylindrical body of vented end cap 150 and define slots to receive attachment eye bolts such as eye bolts 51 seen in FIG. 3, pivotally connected to the associated end adapter 40. These bolts releasably secure the cap 150 in place over the discharge opening 45 of the cylindrical outlet tube 41, with the generally cylindrical body 152 surrounding the outlet tube 41. As illustrated, each cover or end cap 150 may include an upstanding radial hanger 160 on flange 154 to indicate the orientation (upward) of the cover 150 relative to the end adapter 40.

In this embodiment, as seen in FIGS. 5 and 7, the disc-shaped end wall 156 of vented end cap or cover 150 includes a plurality of through holes or flow apertures 162 that provide an inlet for ambient air through the cover. As illustrated in FIG. 7, flow apertures 162 are positioned generally at, or above, a horizontal centerline of the disc-shaped end wall 156.

As illustrated in FIGS. 5 and 6, the air inlet defined by flow apertures 162 is protected from the elements by a shield or vent hood 164 on the exterior of disc-shaped end wall 156. As best seen in FIG. 7, end wall 156 includes an elongated central keyhole slot 165 to cooperate with filter clean seal 190 associated with the vented end cap 150, as will be explained below.

Vent hood 164 has triangular side walls 166 that support planar wall 168 that is integral with the exterior surface of disc-shaped end wall 156 at a location above the flow apertures 162. Side walls 166 diverge toward an enlarged inlet opening 170 at the bottom end of the planar wall 168. Thus, the inlet opening 170 communicates with the flow apertures 162 via the open passage defined by triangular side walls 166, planar wall 168 and disc-shaped end wall 156. The pattern of flow apertures 162 is selected to ensure sufficient air flow inward to the interior of cover 150 during the unloading process.

Referring to FIGS. 5, 8 and 9, there is illustrated a filter clean seal 190 intended for cooperative association with each cover 150 of this embodiment in that it is vented and permits air flow entering end cap 150 though flow apertures 162 to continue into discharge tube 30 through a filtered passage in the clean seal 190 and through semi-circular passage 47 in end adapter 40.

As best illustrated in FIGS. 8 and 9, filter clean seal 190 is a molded polymeric disc having a generally planar circular body 191 with a perimeter rim 192 of increased thickness. The rim has an outer cylindrical surface 193 and annular facing surface 194.

Centrally disposed on one side of disc 190 is a horizontally extending post 195 with a transverse retention flange 196. Post 195 extends in the same direction as annular facing surface 194 of the rim 192. FIGS. 5 and 9 show that the central post 195 also extends from wall 191 on the opposite side of body 191 and forms manipulation element or rotation knob 199. This element is used to rotate clean seal 190 to lock retention flange 196 to wall 156, beyond elongated central slot 165 of cover 150.

The portion of post 195 carrying transverse retention flange 196 is of a length such that when filter clean seal 190 is placed within the cylindrical body 152 of vented end cap 150, transverse retention flange 194 is positionable through slot 165, outside the disc-shaped end wall 156 within the passage defined by vent hood 164. Through manipulation of knob 199, rotation of the filter clean seal 190 one-quarter turn releasably secures it within the end cap 150 between disc-shaped end wall 156 and generally semi-circular passage 47 that leads to discharge tube 30.

As seen in FIGS. 8 and 9, the bottom area below the horizontal axis of clean seal 190 defines a passage 197 protected with a molded mesh web 198. Alternatively, the mesh 198 could be replaced by or augmented with a filter media. It is contemplated that a 30-micron pore size would be satisfactory.

FIGS. 5 and 9 show the filter clean seal 190 affixed within the cover or end cap 150. To restrict air leakage past clean seal 190, it is contemplated that when filter clean seal 190 is installed in cover 150, the rim outer cylindrical surface 193 may seal against interior of cylindrical body 152 of cap 150. Or, as shown in FIG. 5, an annular facing surface 194 may seal against disc-shaped end wall 156. Alternatively, filter clean seal 190 may be sized such that outer cylindrical surface 193 seals against the interior of cylindrical body 152 of end cap 150.

FIG. 10 is an illustration of an alternative arrangement for a filter clean seal 290 housed within end cap 150. Here, the cap 150 is the same configuration as the cap shown in FIG. 5 and provides air flow as previously described. That is vented end cap 150 includes disc-shaped end wall 156 with a plurality of flow apertures 162, protected by vent hood 164 defining inlet opening 170.

Filter clean seal 290 is disclosed, which, like the filter clean seal 190 of FIGS. 5, 8 and 9, provide for filtered air flow into semi-circular passage 47 of end adapter 40 and into discharge tube 30. In this embodiment, the filter clean seal is a disc 291 with an outer rim 292 sized such that its outer cylindrical surface 293 can seal against inner cylindrical surface 42 of cylindrical outlet tube 41 of end adapter 40. Disc 291 includes central post 295 with retention flange 296 at one end for releasable connection of filter clean seal 290 to vented end cap 150. Rotation knob 299 at opposite end of post 295 is used to rotate filter clean seal 290 to achieve connection. Filter clean seal post 295 has a length sufficient, such that, with cover 150 attached to end adapter 40 and transverse retention flange 296 in place, outward of wall 156 of cover 150, the filter clean seal is disposed within cylindrical outlet tube 41. Outer cylindrical surface 293 of the rim of filter clean seal 190 seals against the inner cylindrical surface 42 of outlet tube 41. As in the previous embodiment, filter clean seal 290 includes an opening or passage 297 in the lower portion of disc 291 below the horizontal centerline covered by mesh or filter media 298.

A cleaned and empty hopper car may be prepared for its next load by installation of end caps 150 (with attached filter clean seal 190 or 290) onto the opposite ends of discharge tube 30 at end adapters 40. Of course, the manual operator handles of manual valve closure mechanism 25 are placed in the closed position. As seen in FIG. 3, the flow path within the end adapter 40 is through semi-circular cross-section passage 47 at the lower half of the end adapter 40, generally below the horizontal centerline of the discharge opening 45 of the cylindrical outlet tube 41.

During car unloading, with a vacuum hose connected to outlet tube 41, at the accessible end of outlet gate 30, air is drawn into the far end vented cover or end cap 150 flow apertures 162 in disc-shaped end wall 156. Air flowing vertically upward enters vented end cap 150 through the passage formed by vent hood 164 and flows upward from inlet opening 170 to flow apertures 162. Within the cap volume, the air is directed downwardly to the passage 197 or 297 in clean seal 190 or 290, where it enters the end adapter 41 through mesh or filter 198 or 298 and ultimately discharge tube 30 at its lower portion, generally below the horizontal centerline of discharge tube 30. This air flow permits efficient unloading of the lading at the opposite end adapter 40 by virtue of the applied vacuum. Notably, the air entering discharge tube 30 from the end adapter 40 at the far end of the outlet gate travels along the bottom portion of discharge tube 30 toward the near end of the outlet gate, sweeping along particulate matter and remnants of the lading.

As previously stated, in the embodiment of FIG. 5, air is restricted against bypassing filter clean seal 190 by the sealing engagement of annular facing surface 194 the rim 192 against the interior surface of disc-shaped end wall 156. Or, outer cylindrical surface 293 seals against the interior of generally cylindrical body 152 of end cap 150.

In the embodiment of FIG. 10, outer cylindrical surface 293 at rim 292 of filter clean seal 290 seals against inner cylindrical surface 42 of cylindrical outlet tube 40 of outlet gate 20.

FIGS. 11 through 14 illustrate a further embodiment of a vented end cover or cap 350. It is configured for association with end adapter 40 of an outlet gate 20 of a hopper car, and compliments the principals and accomplishes the goals of the embodiment of FIG. 5 or 10, as well as the vented end cap of the earlier U.S. Pat. No. 9,439,177.

FIG. 11 shows one vented end cap 350 installed upon the outlet tube 41 of a typical outlet gate 20. FIGS. 11 through 14 illustrate details of its structural configuration and function. It is understood that, as in the previous embodiment, outlet gate 20 is secured from the elements by two vented end cap assemblies 350, one at each end adapter 40 at each end of discharge tube 30. In this embodiment, the vented end cap 350 includes an internal filter support housing, generally 374, and a removable filter element 390.

FIG. 11 also illustrates a form of filter clean seal generally 300, suitable for use in association with vented end caps of the embodiment of FIGS. 11 to 17 of the present disclosure to provide vacuum discharge lading removal necessitating access to only one side of the railroad car. The filter clean seal 300 is illustrated in further detail in FIGS. 18 and 19.

The filter clean seal 300 is a monolithic molded polymeric element with an annular or cylindrical body 301. Body 301 includes a surrounding radial flange 303 at one end. A radially inward rib 306 extends about the open end of body 301 at radial flange 303. A conical transition portion 304, having a cone angle of about five degree (5°) extends to transverse disc-shaped filter screen 305.

Figure 14:
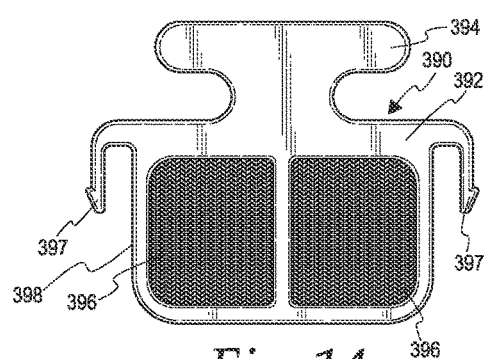
FIG. 14 is a plan view of the removable filter screen of the vented end cap of FIG. 12.
Figure 15:
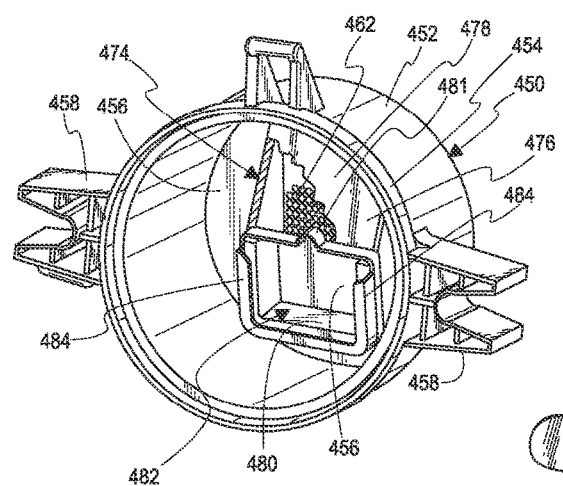
FIG. 15 is a perspective view of the interior of a modified form of the vented end cap of FIG. 11.
Figure 16:
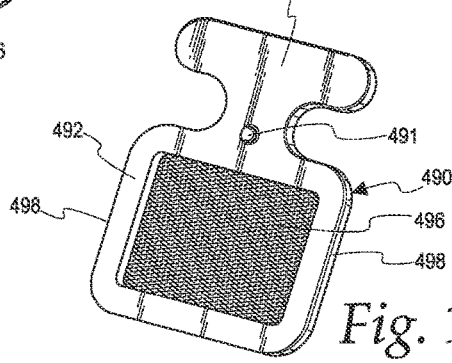
FIG. 16 is a perspective view of a modified form of removable filter screen in the embodiment of the vented end cap of FIG. 15.
Figure 17:
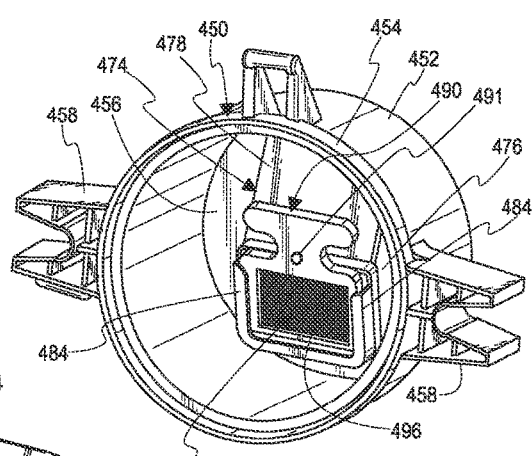
FIG. 17 is a perspective view of the interior of the vented end cap of FIG. 15, showing the modified form of removable filter screen of the present disclosure.
Figure 18:
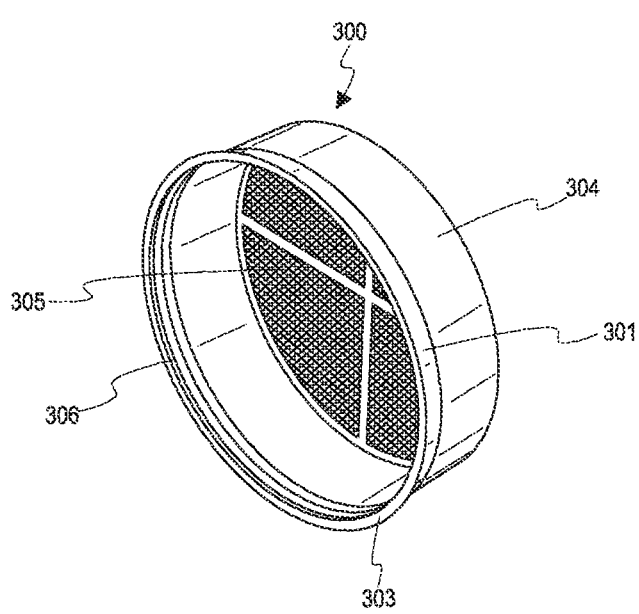
FIG. 18 is a perspective view of a filter clean seal of the embodiment illustrated in FIG. 11.

As will be understood, the axial length of annular body 401 and conical transition portion 304 from surrounding radial flange 303 to disc-shaped screen 305 is sufficient to accommodate the interior structural configuration of vented end cap 350 of the embodiment shown in FIGS. 11 to 14, as well as the modified embodiment of end cap 350 shown in FIGS. 15 to 17.

Screen 305 may be of a mesh size suitable to pass flowing air consistent with the flow requirements of the unloading process. An example is a fifty percent (50%) open area.

Referring to FIG. 11, a cleaned railroad car prepared for use will have a filter clean seal 300 installed in each outlet tube 41 of each outlet gate 20. Filter clean seal 300 is fully inserted into cylindrical outlet tube 41 with radial flange 303 abutting the open end of outlet tube 41. The polymeric material of the filter clean seal 300 is sufficiently flexible that it may be readily removed. The radial inward rib 306 is provided to better grasp the filter clean seal 300 to facilitate its removal.

Filter clean seals 300 are placed within each cylindrical outlet tube 41 of outlet gates 20 as confirmation of readiness for loading. At the unloading site, the near end vented end cap 350 and filter clean seal 300 are removed for attachment of a vacuum hose, as previously described. There is no need to remove filter clean seal 300 at the inaccessible, far end of the car because incoming air passing through the vented end cap 350 would also pass through filter screen 305 of the far end filter clean seal 300. It is also noted that the filter clean seal 300 used in this arrangement would not include post 295, transverse retention flange 296 or rotation knob 299 of the earlier embodiments described above. The filter clean seals of the embodiments of FIGS. 11 to 19 are not connected to end caps 350 or 450.

Figure 4:
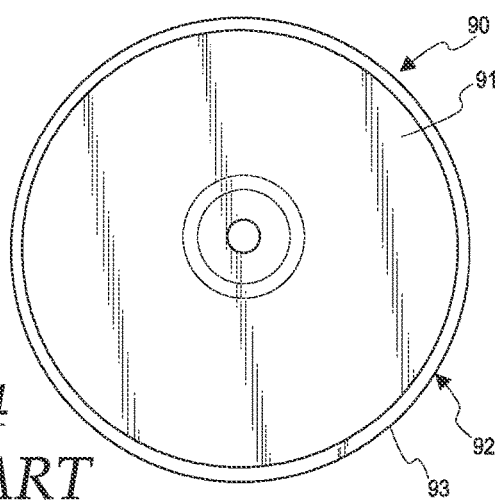
FIG. 4 is a plan view of a clean seal component utilized in the discharge opening at each end of the discharge tube of the outlet gate of FIG. 1.
Figure 19:
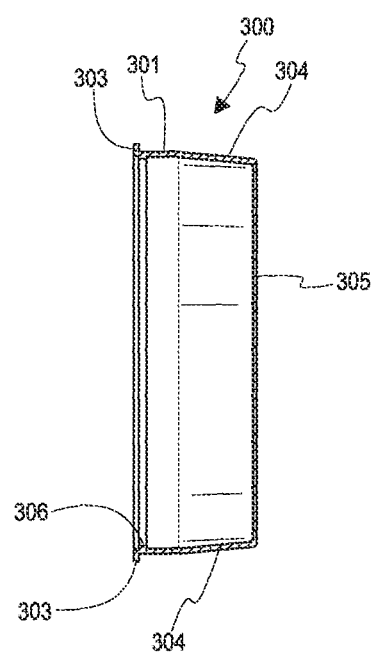
FIG. 19 is a sectional plan view of the filter clean seal of FIG. 18.

Filter clean seals disclosed herein, such as shown in FIGS. 10, 11, and 19, provide a benefit not heretofore associated with the typical "clean seal" discussed in connection with FIGS. 2 and 4. As disclosed herein, employment of vented end caps as disclosed in the embodiments of FIGS. 10 through 19, obviate the need to remove the end cap at the far, or inaccessible side of the hopper car. Similarly, the disc-shaped filter clean seals 290 in FIG. 10 associated with far end cap 150, or the filter clean seals 300 associated with far end caps 350 or 450 of FIGS. 11 to 19, need not be removed during unloading. Thus, these clean seals represent secondary debris filters in the air flow system. Notably, the filter clean seals also act as loose pellet barriers, minimizing spillage of the transported product.

Referring to FIGS. 11 through 14, each vented end cap or cover 350 is a molded component that includes a generally cylindrical body 352 with an attachment flange 354 at an open end and a disc-shaped end wall 356 closing its other end.

Figure 13:
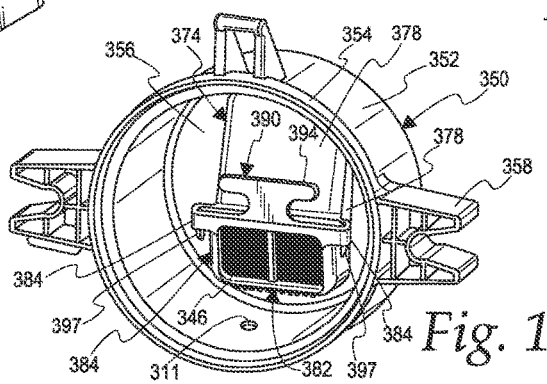
FIG. 13 is a perspective view of the interior of the vented end cap of FIG. 12, showing an installed, removable filter screen of the present disclosure.

The cover or cap 350 is shaped generally like cap150 of FIG. 5. Each cap 350 includes a generally cylindrical body 352 disposed surrounding one cylindrical outlet tube 41 closing discharge openings 45. The cap 350 includes pairs of radial tabs 358 disposed 180° apart on the flange 354. As best seen in FIG. 13, tabs 358 are located equidistant from the horizontal centerline of the generally cylindrical body of vented end cap 350. Tabs 358 define slots to receive attachment eye bolts such as eye bolts 51 seen in FIG. 3, pivotally connected to the associated end adapter 40.

As seen in FIGS. 11 and 13, vented end cap 350 is illustrated to include a drain hole or "weep hole" 311 extending through cylindrical body 352. It is located at the bottom of the cap to permit egress of moisture within the hopper car or contained lading. Pelletized plastic, a common commodity carried in hopper cars, is often at elevated temperature when loaded. Cooling of the lading may form condensate, which presents as water that finds its way down through the outlet gates and into the end caps. Hole 311 is provided to permit escape of any such contaminant. Such a weep hole may be employed in any of the end caps of the embodiments disclosed.

In this embodiment, as seen in FIG. 11, the disc-shaped end wall 356 of vented end cap or cover 350 includes a plurality of through holes or flow apertures 362 that provide an inlet for ambient air through the cap end wall 356. As in the earlier embodiments, through holes or flow apertures 362 are positioned at, or above, the horizontal centerline of the disc-shaped end wall 356. (Refer to FIG. 7)

The ambient air inlet defined by flow apertures 362 is protected from the elements by exterior shield or vent hood 364, which includes triangular side walls 366 that support planar wall 368 that is integral with the exterior surface of disc-shaped end wall 356 at a location above the flow apertures 362. Side walls 366 diverge toward an enlarged inlet opening 370 at the bottom end of the planar wall 368. Thus, the inlet opening 370 communicates with the flow apertures 362, via air flow passage defined by triangular side walls 366, planar wall 368 and exterior surface of disc-shaped end wall 356. The pattern of flow apertures 362 is selected to ensure sufficient air flow during the unloading process.

Internally of cap 350, there is provided a filter support housing 374 molded or otherwise affixed to the interior disc-shaped end wall 356. Filter support housing 374 is shaped similarly to the vent hood 364 on the exterior of disc-shaped end wall 356. It includes spaced generally triangular side walls 376, that support a planar wall 378. These walls commence above through holes 362 and diverge downwardly toward a closed bottom wall 380 forming an air flow chamber surrounding flow apertures 362 within cover 350. Planar wall 378 is shorter than corresponding planar wall 368 of exterior vent hood 364 and defines with bottom wall 380 and side walls 376 an air flow chamber with an exit opening 382 open to the interior of vented end cap 350. A filter element support frame 384 is formed on walls 376, 378 and 380 at exit opening 382. This frame defines a slot that slidably receives, and retains, filter screen element 390, described in detail below.

As illustrated, and previously described, vented end cap or cover 350 may be molded of plastic or other similar material. In this regard, the additional elements of the external vent hood 364, and filter support housing 374, may be integrally molded, or, as shown, separate elements attachable to the end wall 356 in surrounding relation to flow apertures 362.

FIG. 11 illustrates one option which is to provide cylindrical connection posts 386 and 387, which, during assembly housing, can be adhered together to secure the vent hood 364 and air flow chamber defining filter support housing 374 together. An alternative to connection posts 386 and 387 would be weld tabs along the edges of triangular side walls 366 of vent hood 364 and edges of triangular side walls 376 of filter support housing 374 that contact the disc-shaped end wall 356 of vented end cap 350. Appropriate slots would be provided in disc-shaped end wall 356 to receive the weld tabs and the components are connected by sonic welding. The vent hood 164 of the embodiments of FIGS. 5 and 10 could be similarly attached to the disc-shaped end wall 156 of vented end cap 150.

Turning now to FIG. 14, this is illustrated filter screen element 390. This is a generally planar frame 392 with handle portion 394 and filter media 396. Filter media 396 may be a molded mesh or other medium and may have a 30-micron capture capability.

As seen in FIG. 14, filter screen element 390 includes lateral edges 398 that slide into channels defined on walls 376 so as to overlie that exit opening 382. In this embodiment, filter screen element 390 includes retention prongs 397, which releasably secure filter screen element 390 in place on filter support housing 374 at the filter element support frame 384.

In the embodiment of FIGS. 11 to 14, the air flow path is similar to that in the earlier embodiments. With a vacuum hose connected to outlet tube 41 at the accessible end of an outlet gate 20, air is drawn into the far end of the discharge tube 30 through the vented end cap 350. Air enters vent hood 364 at inlet opening 370 and travels upwardly to flow apertures 362 in disc-shaped end wall 356, at or above the horizontal centerline of wall 356. Filter support housing 374 directs flow downward from flow apertures 362 toward exit opening 382. The incoming air flows out of the filter support frame 374 through filter media 396 below the horizontal centerline. Thereafter, flowing air travels through semi-circular opening 47 of end adapter 40 and enters the lower portion of discharge tube 30 where it combines with the discharging lading (pellets) and flows into storage. Importantly, the flow within the discharge tube 30 is concentrated on the bottom portion of discharge tube 30 and aids in sweeping that area clear of material. This action improves unloading efficiently and enhances effectiveness of the discharge process.

FIGS. 15 to 17 illustrate a vented end cap 450, similar to, but somewhat modified from, the vented end cap 350 of the embodiment of FIGS. 11 to 14. It includes a vent hood on the exterior surface of disc-shaped end wall. It includes a removable filter screen element 490 and varies only in the manner of attachment and retention of the filter screen element 490 within the end cap 450. Vented end caps 450 are utilized and function in the manner described in relation to vented end caps 350 of FIGS. 11 to 14.

FIGS. 15 through 17 illustrate details of structural configuration and function of vented end caps 450. It is understood that, as in the previous embodiment, outlet gate 20 is secured from the elements by two vented end caps 450, one at each end adapter 40 at each end of discharge tube 30. The vented end caps 450 include an internal filter support housing, generally 474, and removable filter element 490. Also, a filter clean seal 300 is contemplated in this embodiment, as discussed in connection with end caps 350 of the embodiment of FIGS. 11 to 14.

Referring to FIGS. 15 through 17, each vented end cap cover 450 is a molded component that includes a generally cylindrical body 452 with an attachment flange 454 at an open end and a disc-shaped end wall 456 closing its other end.

The cap 450 is shaped generally like cap 150 of FIG. 5. The caps 350 are disposed with generally cylindrical body 352 surrounding each cylindrical outlet tube 41 closing discharge openings 45. The cap 450 includes radial tabs 458 on the flange 454. Tabs 458 define slots to receive attachment eye bolt such as eye bolt 51 seen in FIG. 3, pivotally connected to the associated end adapter 40.

In this embodiment, the disc-shaped end wall 456 of vented end cap or cover 450 includes a plurality of through holes or flow apertures 462 similar to apertures 362 of FIGS. 11 to 14, that provide an inlet for ambient air through the cap end wall 456. As in the earlier embodiments, flow apertures 462, seen in FIG. 15, are positioned at, or above a horizontal centerline of the disc-shaped end wall 456. (Refer to FIG. 7)

The vented end cap 450 of the embodiment of FIGS. 15-17, the air inlet defined by the through holes flow apertures 462 are protected from the elements by an exterior shield, or vent hood, which is the same as the vent hood 364 of the embodiment of FIG. 11. It includes triangular side walls that support a planar wall that is integral with the exterior surface of disc-shaped end wall 456 at a location above the through holes 462. The side walls diverge toward an enlarged inlet opening at the bottom end of the planar wall. Thus, an inlet opening communicates with the flow apertures 462 via the air flow passage defined by triangular side walls, planar wall and the exterior surface of disc-shaped end wall 456. The pattern of flow apertures 462 is selected to ensure sufficient air flow during the unloading process.

As seen in FIG. 15, internally of cap 450, filter support housing 474 is molded or otherwise affixed to the interior of disc-shaped end wall 456. Filter support housing 474 is shaped similarly to the vent hood on the exterior of disc-shaped end wall 456. It includes spaced generally triangular side walls 476, that support a planar wall 478. These walls commence above flow apertures 462 and diverge downwardly toward a closed bottom wall 480 forming an air flow chamber surrounding flow apertures 462 within cap 450. Planar wall 478, bottom wall 480 and side walls 476 define an exit opening 482 open to the interior of vented end cap 450. A channel-shaped filter element support frame 484 is formed on walls 476, 478 and 480 in surrounding relation to exit opening 482. This frame slidably receives, and retains, filter screen element 490, described in detail below.

In this embodiment, planar wall 478 terminates in a transverse edge 479, which includes centrally disposed arcuate relief 481. This arcuate relief coacts with filter screen element 490, as will be explained.

As illustrated, and previously described, vented end cap or cover 450 may be molded of plastic or other similar material, and the additional elements of the external vent hood 464 and filter support housing 474, may be separate molded components attachable to the end wall 456 in surrounding relation to the flow apertures 462 in the manner described in connection with vented end cap 350.

Turning now to FIG. 16, this is illustrated filter screen element 490. It is a generally planar frame 492 with handle portion 494 and filter media 496. Filter media 496 may be a molded mesh or other medium and may have a 30-micron capture capability.

As seen in FIGS. 16 and 17, filter screen element 490 includes lateral edges 498 that slide into the channels defined on walls 476 so as to overlie exit opening 482. Centrally disposed on planar frame 492 at handle portion 494, filter screen element 490 includes a detent 491. On installation of filter screen 490 into the channels on filter support housing 474, detent 491 releasably engages the transverse edge 479 within the arcuate relief 481 to releasably secure filter screen element 490 in place on filter support frame 474.

In the embodiment of FIGS. 15 to 17, the air flow path is similar to that in the earlier embodiments. With a vacuum hose connected to outlet tube 41 at the accessible end of an outlet gate 20, air is drawn into the far end of the discharge tube 30 through the vented end cap 450. Air enters the vent hood at its inlet opening and travels upwardly to the flow apertures in disc-shaped end wall 456. Filter support housing 474 directs flow downward from the flow apertures 462 toward exit opening 482. The incoming air flows out of filter support housing 474 through filter media 496 below the horizontal centerline. Thereafter, flowing air travels through semi-circular opening 47 of end adapter 40 and enters the lower portion of discharge tube 30 where it combines with the discharging lading (pellets) and flows into storage. Importantly, the flow within the discharge tube 30 is concentrated on the bottom portion of discharge tube 30 and aids in sweeping that area clear of material. Again, as in earlier embodiments, this action improves unloading efficiently and enhances effectiveness of the discharge process.

In this application, terms inner or outer, interior or exterior, are to be given their ordinary meaning in relation to the disclosed embodiments of vented end caps for an outlet gate of a railcar. Reference to a "horizontal centerline" is made to aid understanding of the position of features of the disc-shaped end wall of the disclosed outlet gate vented end caps. It comprises an imaginary line that bisects the disc-shaped end wall of end caps 150, 350, or 450. (Refer to FIG. 7)

Various features of the present invention have been described with reference to the illustrative embodiments. It should be understood, however, that modifications may be made without departing from the scope of the disclosed subject matter.

The invention claimed is:

1. An outlet gate for unloading a railroad car carrying particulate lading, comprising
   a manual valve closure mechanism,
   a discharge tube disposed below the manual valve closure mechanism,
   to receive particulate lading through said manual closure mechanism, including an end adapter at each end having a cylindrical outlet tube defining a discharge opening,
   a removable vented end cap secured to each said outlet tube removably closing each said discharge opening,
   each said vented end cap comprising:
      a generally cylindrical body surrounding said cylindrical outlet tube;
      a disc-shaped end wall with an interior surface, an exterior surface, and at least one flow aperture extending therethrough, the at least one flow aperture located at a central portion of the disc-shaped end wall;
      a vent hood on the exterior surface of said disc-shaped end wall defining with said end wall an air flow passage having an inlet opening and communicating with said at least one flow aperture, wherein:
         the interior surface forms a clean seal at a peripheral of the disc-shaped end wall;
         the exterior surface is a planar surface;
         the vent hood comprises two side walls extending from the exterior surface that conjoin with a planar wall, the two side walls diverge towards the inlet opening at a bottom of the planar wall;
         the air flow passage is structured as a conduit that runs from the inlet opening, upwards towards the at least one flow aperture, and downwards towards the clean seal; and
      a filter support housing defining with the interior surface of said end wall, an air flow passage chamber having an exit opening communicating with said air flow passage and with the interior of said vented end cap; and
      a filter media supported upon said filter support housing between said at least one flow aperture and said exit opening.

2. An outlet gate for unloading a railroad car, as claimed in claim 1, wherein said end wall of each said end cap includes a plurality of flow apertures extending therethrough.

3. An outlet gate for unloading a railroad car, as claimed in claim 2, wherein said plurality of flow apertures are disposed at or above the horizontal centerline of said end wall.

4. An outlet gate for unloading a railroad car, as claimed in claim 3, wherein said inlet opening, defined by said vent hood and said exterior surface of said cap, is vertically lower than said plurality of flow apertures.

5. An outlet gate for unloading a railroad car, as claimed in claim 4, wherein said exit opening of said filter support housing is vertically lower than said flow apertures in said end wall.

6. An outlet gate for unloading a railroad car, as claimed in claim 5, wherein said filter media is removable from said filter support housing.

7. An outlet gate for unloading a railroad car, as claimed in claim 6, wherein said end cap includes a weep hole at the bottom of said cap.

8. A vented end cap for an outlet gate for unloading a railroad car carrying particulate lading, comprising
- a generally cylindrical body,
- a disc-shaped end wall with an interior surface, an exterior surface, and at least one flow aperture extending therethrough, the at least one flow aperture located at a central portion of the disc-shaped end wall;
- a vent hood on the exterior surface of said disc-shaped end wall defining with said end wall an air flow passage having an inlet opening and communicating with said at least one flow aperture, wherein:
  - the interior surface forms a clean seal at a peripheral of the disc-shaped end wall;
  - the exterior surface is a planar surface;
  - the vent hood comprises two side walls extending from the exterior surface that conjoin with a planar wall, the two side walls diverge towards the inlet opening at a bottom of the planar wall;
  - the air flow passage is structured as a conduit that runs from the inlet opening, upwards towards the at least one flow aperture, and downwards towards the clean seal; and
- a filter support housing defining with the interior surface of said end wall, an air flow chamber having an exit opening communicating with said air flow passage, and with the interior of said vented end cap, and
- a filter media supported upon said filter support housing between said at least one flow aperture and said exit opening.

9. A vented end cap, as claimed in claim 8, wherein said end wall of said end cap includes a plurality of apertures extending therethrough.

10. A vented end cap, as claimed in claim 9, wherein said plurality of flow apertures are disposed at or above the horizontal centerline of said end wall.

11. A vented end cap, as claimed in claim 10, wherein said inlet opening defined by said vent hood and said exterior surface of said cap is vertically lower than said plurality of flow apertures.

12. A vented end cap, as claimed in claim 11, wherein said exit opening defined by said filter support housing is vertically lower than said flow apertures in said end wall.

13. A vented end cap for unloading a railroad car, as claimed in claim 12, wherein said filter media is removable from said filter support housing.

* * * * *